March 4, 1947.  A. MILLER  2,416,838
PARKING DEVICE
Filed March 11, 1944   3 Sheets-Sheet 1
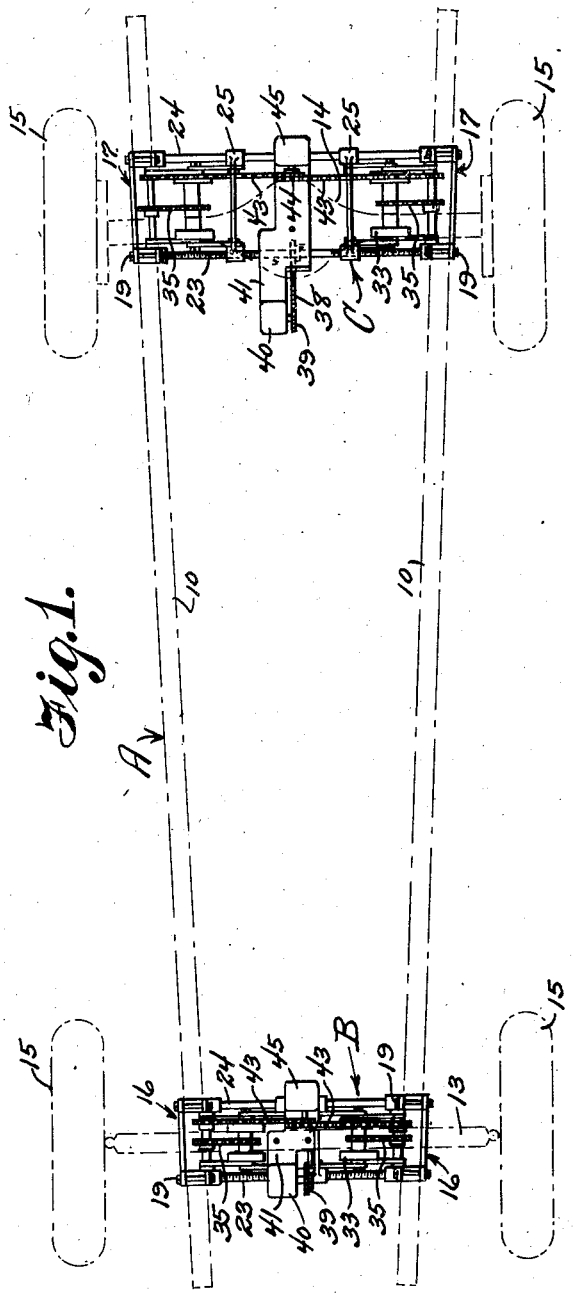
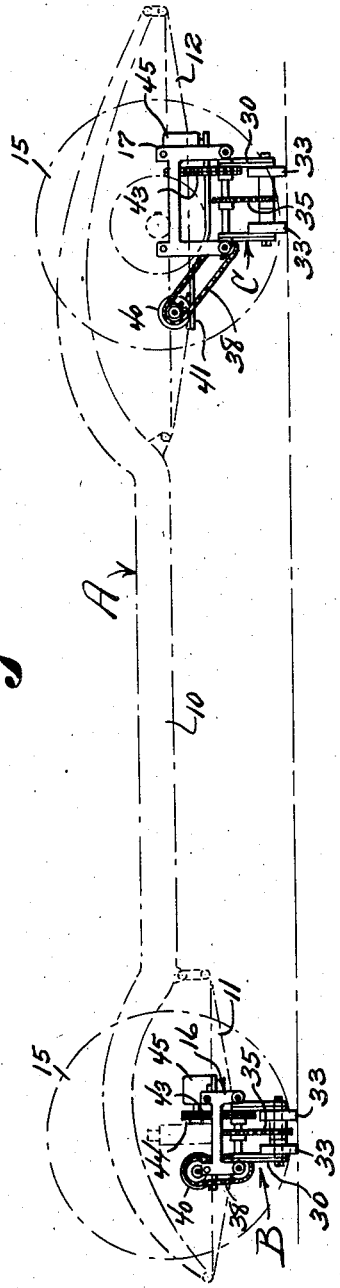
Abba Miller INVENTOR.
BY
Victor J. Evans & Co.
ATTORNEYS

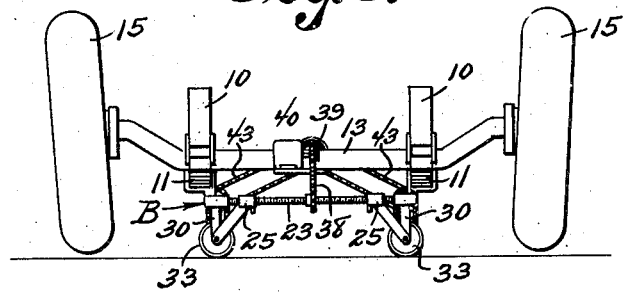
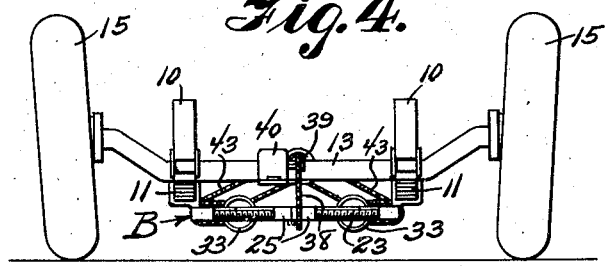
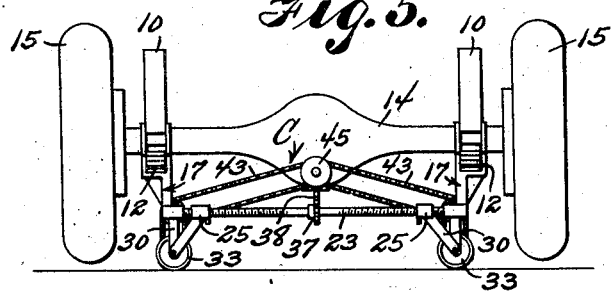
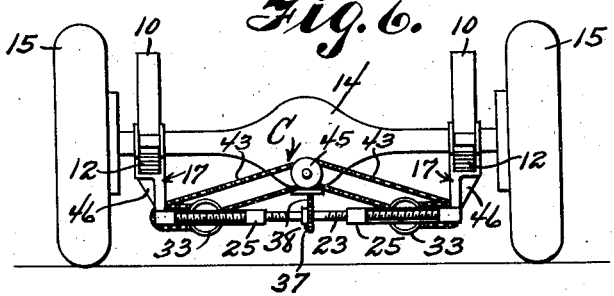

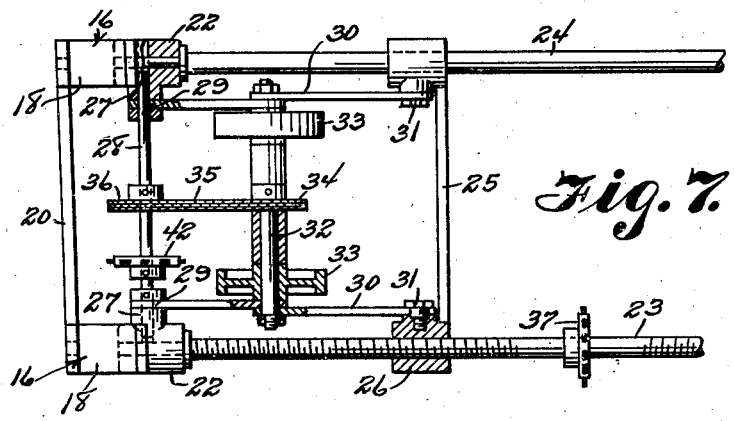

Patented Mar. 4, 1947

2,416,838

UNITED STATES PATENT OFFICE 2,416,838

PARKING DEVICE

Abba Miller, Cleveland, Ohio

Application March 11, 1944, Serial No. 526,031

1 Claim. (Cl. 180—1)

The invention relates to a lift jack and shift truck for motor vehicles or the like, and more especially to vehicle elevating and parking mechanism.

The primary object of the invention is the provision of mechanism of this character, wherein on equipping a vehicle therewith the latter can be elevated and shifted from one locality to another for close quartered storing or parking thereof, without liability of damaging the vehicle when this is being done, the mechanism being motor driven, and in this manner dispensing with the power plant of the vehicle or man power for accomplishing the purposes of such mechanism.

Another object of the invention is the provision of mechanism of this character, wherein its construction and arrangement permits of permanent mounting thereof on a vehicle, whereby it will be at all times ready for service, and enables the easy and quick parking of the vehicle within contracted spaces outside of or interiorly of an edifice, the vehicle carrying such mechanism being shiftable automatically in a lateral direction to either side of the line of draft thereof by its power plant.

A further object of the invention is the provision of mechanism of this character, wherein the same is automatically folded or extended for the lowering and raising of a vehicle when equipped therewith, and when such mechanism is in a folded condition the vehicle is susceptible of normal use for transportation purposes, and does not detract from the appearance thereof.

A still further object of the invention is the provision of mechanism of this character, which is thoroughly reliable and efficient in operation, simple in its construction, compact, strong, durable, mountable on various types of vehicles, readily and easily operated, and inexpensive to manufacture and install.

With these and other objects in view the invention consists in the features of construction, combination and arrangement of parts as will be hereinafter more fully described in detail, illustrated in the accompanying drawings, which show the preferred embodiment of the invention, and pointed out in the claim hereunto appended.

In the accompanying drawings:

Figure 1 is a diagrammatic top plan view of a motor vehicle chassis showing the mechanism constructed in accordance with the invention applied thereto, the chassis being disclosed by dotted lines, while the mechanism is shown by full lines.

Figure 2 is a side view thereof.

Figure 3 is a front end elevation and the chassis elevated.

Figure 4 is a view similar to Figure 3 showing the chassis lowered and the mechanism folded.

Figure 5 is a rear end elevation of the chassis with it in raised position.

Figure 6 is a view similar to Figure 5 showing the chassis lowered and the mechanism folded.

Figure 7 is a fragmentary plan view, partly in section of a portion of the mechanism.

Figure 8 is a fragmentary sectional elevation of portions of the structure shown in Figure 7.

Figure 9 is a sectional view taken on the line 9—9 of Figure 8 looking in the direction of the arrows.

Figure 10 is an elevation of one of the hanger fittings of the mechanism.

Similar reference characters indicate corresponding parts throughout the several views in the drawings.

Referring to the drawings in detail, A designates generally by dotted lines the chassis of a motor vehicle, of any standard type having the frame sills 10 supporting as usual front and rear leaf springs 11 and 12, respectively, the former carrying the front intermediate axle section 13 while the rear springs 12 support the rear axle housing 14, for front and rear wheels 15 for the vehicle.

Adaptable fore and aft of the vehicle at the front and rear springs 11 and 12 therefor is the elevating and parking mechanism constituting the present invention, which comprises the independent fore and aft assemblies B and C, respectively. The assemblies involve pairs of vertically disposed hangers 16 and 17, respectively, which are matched with each other when they are applied to the springs 11 and 12, the hangers being formed with saddle seats 18 on which are super-imposed the said springs 11 and 12. The springs in this position are fixedly held by bolts 19 fitted in the hangers 16 and 17 immediately above such springs and clamp the hangers thereon, without interference with the action of the said springs.

The hangers 16 and 17 at the saddle seats 18 are formed with horizontal cross struts 20, while at the spaced vertical leg portions 21 of these hangers close to the lower ends thereof are inside bearings 22 for the fitting therein of spaced parallel horizontally arranged feed screw and guide rod 23 and 24, respectively, both being extended crosswise of the chassis frame of the vehicle to the opposite hangers 16 and 17 of the pairs thereof. At each side of the longitudinal axis of the chassis frame of the vehicle and movably mounted on the screw and rod 23 and 24 is a runner or traveling bridge piece 25, having the screw feed hub 26 fitting with the screw 23, while at substantially right angles to the bearings 22 on the portions 21 are further bearings 27 in which is journaled a driven shaft 28, having swingingly connected thereto at 29 toggle acting raising and lowering jack links 30, these being also swingingly pivoted at 31 to the runner or traveling bridge piece 25. The links 30 carry a driving axle 32 for a pair of ground wheels 33, one being idle and the other fixed to the said axle for positive driving thereof by the same. The axle 32 has fixed thereto a sprocket gear 34 over which is trained a sprocket chain 35, the latter being also trained over a sprocket gear 36 fixed to the driven shaft 28.

The screw 23 has fixed thereto a sprocket gear 37 over which is trained a sprocket chain 38, having driving connection at 39 with an electric power motor 40, which is stationarily supported in any suitable manner, preferably on a support 41 of any suitable construction on the axle section and housing as may be required. The sprocket chain 38 operates the link jack for the raising and lowering of the ground wheels 33 to elevate or lower the vehicle wheels 15 from or onto the ground. The shaft 28 is fitted with a sprocket wheel 42 over which is trained a driven sprocket chain 43 having driving connections 44 with an electric power motor 45, common to the support 41, these motors 40 and 45 being of the reversible driving type of any standard construction, and are manually switch controlled in any desirable manner from within the vehicle.

The hangers 17 of the rear assembly C are of slightly different shape and size with respect to the hangers 16 for proper fitting at the aft end of the vehicle, and such hangers 17 are formed with bracing wings 46 for their saddle 18 therein.

It should be apparent that when the vehicle is jacked up with its wheels 15 off of the ground and power is transmitted to the wheels 33 of the link jacks, the said vehicle will be caused to travel laterally of its line of draft by its own power plant, so that such vehicle can be parked in contracted space in this lateral direction, which could not be accomplished by steering the said vehicle thereto under its own power.

When the vehicle is operated by its own power plant and under normal conditions the mechanism is raised to an inactive position beneath the chassis frame of the vehicle and the wheels of the latter are in contact with the ground for the driving of such vehicle.

The jacks at the fore end of the vehicle are operated in unison with each other, and similarly the jacks at the aft end are moved together, the fore and aft jacks being independent of each other for separate operations, as will be apparent.

The feed screws 23 regulate the raising and lowering movements of the jacks for the lifting of the vehicle and its lowering.

What is claimed is:

A mechanism of the character described, comprising a frame composed of pairs of parallel opposed bars, a cross-strut connecting the bars of each pair in spaced relation to each other, upwardly extending saddles at the upper ends of said bars for attachment to the axle of an automobile, bearings on the lower ends of said bars, a guide rod mounted in one of said bearings of each pair, a feed screw mounted in the other of said bearings, a travelling runner mounted on said feed screw and said guide rod, a screw feed hub on one end of said runner for mounting the end on the feed screw, and a smooth bore hub on the opposite end for mounting this end on the guide rod, bearings on the lower ends of said bars at right angles to said first mentioned bearings, a drive shaft in said bearings, links pivotally connected to said last mentioned bearings, other links pivotally connected to said screw hub and to said small bore hub, said links pivotally connected to each other and to an axle at their opposite ends, wheels mounted on said axle, sprocket wheels on said shaft and said axle in alinement with each other, a sprocket chain on said sprockets, and a sprocket on said feed screw adapted to be connected to a source of power whereby said feed screw is rotated to raise and lower the axle of said automobile through relative movement of said links.

ABBA MILLER.

REFERENCES CITED

The following references are of record in the file of this patent:

UNITED STATES PATENTS

| Number | Name | Date |
|---|---|---|
| 1,827,853 | Nenna | Oct. 20, 1931 |
| 1,896,118 | Wellinsiek | Feb. 7, 1933 |
| 1,703,070 | Barshell | Feb. 19, 1929 |
| 1,758,964 | Myers | May 20, 1930 |
| 1,914,643 | McCann | June 20, 1933 |
| 1,940,724 | Mizzy et al. | Dec. 26, 1933 |
| 2,140,493 | Barr | Dec. 20, 1938 |
| 2,158,891 | Beacher | May 16, 1939 |

FOREIGN PATENTS

| Number | Country | Date |
|---|---|---|
| 470,887 | German | Feb. 1, 1929 |
| 537,726 | German | Nov. 6, 1931 |